United States Patent [19]
Rein et al.

[11] Patent Number: 5,281,491
[45] Date of Patent: Jan. 25, 1994

[54] BATTERY SEPARATOR

[75] Inventors: Burton M. Rein, Mountain Lakes, N.J.; Howard J. Troffkin, Potomac, Md.; Robert M. Spotnitz, Catonsville, Md.; Richard T. Giovannoni; Yihong Guo, both of Columbia, Md.

[73] Assignee: W. R. Grace & Co., New York, N.Y.

[21] Appl. No.: 808,591

[22] Filed: Dec. 20, 1991

[51] Int. Cl.⁵ .............................................. H01M 2/16
[52] U.S. Cl. ...................................... 429/62; 429/145
[58] Field of Search ................................... 429/62, 145

[56] References Cited

U.S. PATENT DOCUMENTS

| | | | |
|---|---|---|---|
| 4,650,730 | 3/1987 | Lundquist et al. | 429/62 |
| 4,731,304 | 3/1988 | Lundquist et al. | 429/62 |
| 4,741,979 | 5/1988 | Faust et al. | 429/62 X |
| 4,973,532 | 11/1990 | Taskier et al. | 429/62 |

Primary Examiner—Stephen Kalafut
Attorney, Agent, or Firm—Howard J. Troffkin

[57] ABSTRACT

The present invention is directed to a multi-ply unfilled microporous sheet product composed of at least one first ply and at least one second ply which are, respectively, formed from polymeric compositions having different rheological properties and to a method of forming said sheet product.

25 Claims, No Drawings

BATTERY SEPARATOR

BACKGROUND OF THE INVENTION

The subject invention is directed to sheet products which are useful as separators in batteries, in particular, separators in lithium batteries to prevent the occurrence of overheating and thermal-runaway.

Storage batteries have at least one pair of electrodes of opposite polarity and, generally, have a series of adjacent electrodes of alternating polarity. The current flow between these electrodes is maintained by an electrolyte which can be acid, alkaline or substantially neutral depending on the nature of the battery system. Separators are located in the batteries between adjacent electrodes of opposite polarity to prevent direct contact between the oppositely charged electrode plates while freely permitting electrolytic conduction. The separator is normally in the form of a thin sheet or film or in certain designs can be in the form of an envelope surrounding each electrode plate of one polarity. It is generally agreed that separators should be (a) thin and light weight to aid in providing a battery of high energy density, (b) resistant to degradation and instability with respect to the battery components with which it is in contact, (c) capable of exhibiting a high degree of electrolytic conductivity (low electrolytic resistance) and (d), in battery systems where appropriate, capable of inhibiting formation and growth of dendrites.

Lithium batteries have distinct advantages over other storage batteries. These batteries are capable of providing much higher power storage densities than other types of batteries, excellent shelf life, high energy density (energy content per unit weight) due to the low atomic weight of lithium metal, and high potential for forming a battery in conjunction with positive electrodesfar removed from the lithium electrode in electromotive series. The battery can be formed in any conventional physical design:-cylindrical, rectangular or disc-shaped "button" cells, and are normally of a closed cell configuration. Such batteries are generally composed of a negative lithium electrode, a positive electrode and a non-aqueous electrolyte. The negative electrode is conventionally lithium metal or its alloy on a support, such as a nickel coated screen. Positive electrodes of various types have been suggested, including metal oxides, such as manganese dioxide or transition metal sulfides such as sulfides of cobalt, nickel, copper, titanium vanadium, chromium, cerium and iron. These may be used singly or as mixtures and may further contain other metal ions, such as alkali metal ions. The positive electrode may further contain carbon and a current collector. The electrolyte is formed of a non aqueous solvent containing a lithium salt. For example, solvents may be acetonitrile, tetrahydrofuran, propylene carbonate, and various sulfones. The lithium salts may be lithium perchlorate, iodide or hexafluroarsenate and the like. An additional, normally passive, component of the battery is a separator membrane located between plates of opposite polarity to prevent contact between such plates while permitting electrolytic conduction.

Separators conventionally used in present battery systems are formed of polymeric films which when placed in an electrolyte or electrolyte system, are capable of exhibiting a high degree of conductivity while being stable to the environment presented by the battery. The films may be macroporous or microporous to thus permit transportation of electrolyte. Examples of such separators include polypropylene sheet which has been stretched and annealed to provide microporosity in the sheet. Such sheets, as disclosed in U.S. Pat. Nos. 3,426,754; 3,558,764; 3,679,538; 3,801,404 and 4,994,335, are normally highly oriented and shrink when subject to heat. Other examples are filled polymeric sheets such as those disclosed in U.S. Pat. Nos. 3,351,495 and 4,287,276 in which the electrolyte is capable of passing through the separator through microporous channels and by the wicking of the filler.

Due to the reactivity of lithium, a major problem encountered with these batteries involves overheating of the cell due to improper use of the cell, e.g. accidentally reversing polarity of battery during charging; contact between electrodes of opposite polarity such as by dendrite formation or shrinkage of separator; formation of high surface spongy lithium which exothermally reacts with the solvent-electrolyte; as well as other known conditions. Such overheating tends to cause thermal runaway and potentially explosive effects as the system continues to act in its defective mode. This must be controlled to provide a battery having commercial acceptability. One method of controlling or preventing thermal runaway is to have the battery casing connected to a sensor which shuts down the electrical system of the apparatus when overheating is detected. This method requires additional electrical circuitry and associated devices and is unable to make early detection of internal cell overheating and preventive effort.

Conventional polymeric films employed as separators lithium batteries are generally not capable of preventing any uncontrolled overheating. Some separator films are inert to heat and, therefore, do not trigger any preventative mechanism. Other presently used separators, such as microporous polyolefins, when subjected to elevated temperatures exhibit dimensional instability and/or degradation permitting contact between large sections of electrodes of opposite polarity which only accelerates the thermal-runaway of a battery.

Recently U.S. Pat. No. 4,650,730 disclosed a sheet product which is useful as a battery separator and has the capability of drastically reducing its porosity at a predetermined elevated temperature. Thus, the separator is capable, upon detection of internal overheating of shutting-down the battery's system by becoming a barrier to the passage of ions between electrodes of opposite polarity. This separator is composed of a sheet product having at least two microporous plies with one ply being a substantially unfilled microporous sheet capable of transforming to a non-porous sheet at a predetermined temperature while the second ply is a highly filled microporous sheet which is substantially stable at that temperature. U.S. Pat. No. 4,650,730 (the teachings of which are expressly incorporated herein by reference) forms its sheet product by methods which include formation of individual sheets, bonding them together and providing either multiple extraction steps or a combination of extraction and processing steps. These multi-step methods provide a disincentive to forming the sheet product as a cost-effective means to provide safety to lithium battery designs.

The present invention is directed to an effective and efficient method of forming a two-ply microporous sheet product capable of having at least one ply of the sheet product transform to a substantially non-porous ply at a predetermined elevated temperature while retaining the length and breadth dimensions of the sheet product.

SUMMARY OF INVENTION

The present invention is directed to a multi-ply sheet product composed of at least one first ply and at least one second ply which are, respectively, composed of polymeric compositions having different rheological properties and to an effective method for forming a multi-ply sheet product useful as a shut-down battery separator. The method comprises coextruding a first and a second polymeric composition into a multi-ply non-porous sheet. The first and second composition are each composed of a different polymer having rheological properties which differ from each other and, subsequently, imparting porosity to produce a porous multi-ply sheet.

DETAILED DESCRIPTION

The present invention provides an effective and efficient method for forming a multi-ply sheet product. The present method requires first forming a multi-ply, non-porous polymeric initial sheet product and then inducing porosity therein, as fully described herein below.

For purposes of clarity, some of the terms used herein and in the appended claims to describe the instant invention are defined below:

A "sheet" is intended to define a structure having large length and breadth dimensions with respect to its thickness and the thickness is less than about 0.025 cm., preferably less than about 0.005 cm.

A "ply" is sheet-like material formed from a substantially uniform polymeric composition and is a component of an initial sheet product and a final sheet product, as defined below.

An "initial sheet product" is a substantially nonporous multi-ply structure having (a) at least one ply composed of a polymeric composition and (b) at least one ply composed of a different polymeric composition from at least one ply (a).

A "sheet product" is a microporous, multi-ply structure having (a) at least one ply which is microporous, composed of a polymeric composition and capable of transforming to a substantially non-porous ply at a predetermined transformation temperature and (b) at least one ply which is microporous, composed of a different polymeric composition from the at least one ply (a) and capable of maintaining its dimensions at temperatures of from ambient to at least about 10° C., preferably at least about 20° C. greater than the transformation temperature of ply (a); and all plies are bond together so as to substantially maintain the length and breadth dimension of the sheet product structure.

The term "first", when used, is intended to modify terms to reference them to ply (a) and components forming same of initial sheet product and of sheet product.

The term "second", when used, is intended to modify terms to reference them to a ply (b) and components forming same of initial sheet product and of sheet product.

The term "polymeric composition" refers to a thermoplastic polymer which may contain, substantially uniformly distributed therein, other materials such as plasticizers, antioxidants, dyes, colorants, extractable material (a liquid, at least at elevated temperature, which is a latent solvent for the polymer) and the like. The polymeric compositions found useful in the present invention are substantially free of solid particulate fillers.

The term "fluidity" is intended to refer to the ability of a polymer composition to flow, that is to have polymer molecules of the composition capable of sliding over one another. The ability will depend upon the polymer's particular configuration, i.e. linear or branched, crystalline or amorphous, degree of crosslink, temperature of the composition and the like. The fluidity can be measured by conventional techniques such as using Standard Load Melt Index of High Load Melt Index tests (ASTM D-1238-57T) modified to be measured at varying temperatures.

The term "viscosity" is intended to refer to the ability of a polymer composition to resist flow. Viscosity is inversely related to fluidity.

A "separator" is a component of a battery, in particular a storage battery, by which the component maintains a separation between adjacent electrode plates of opposite polarity. A separator of the present invention is formed from a sheet product and may be in various configurations such as, flat, ribbed, corrugated sheet product in the form of a membrane or envelope capable of maintaining separation between electrodes.

The present process is capable of providing a microporous, multi-ply sheet product capable of exhibiting nonporosity of at least one ply thereof at a predetermined temperature in an effective and efficient manner. The process entails forming an initial sheet product. The initial sheet product is a multi-ply structure having at least one first ply composed of a first polymer composition and at least one second ply composed of a second polymer composition.

The sheet products of the present invention utilize first and second polymeric compositions which have different rheological properties with respect to temperature. These properties can be readily determined by known methods, such as by a modified Standard Load Melt Index or High Load Melt Index test, made over a range of temperature, particularly a range of from 80° to 150° C., by differential scanning calorimetry, or thermomechanical analysis. The viscosity of the composition forming the first ply should be substantially equal to or less than that of the composition of the second ply at all temperatures of concern (i.e. at temperatures from about ambient to the melt temperature of the second polymer). It is understood that both the first and second polymer compositions exhibit very high viscosity at low and moderate temperatures where they are solid materials. At these temperatures, (e.g. ambient to about 70° C.) both solid compositions have substantially equal (approach infinite values) viscosities as they do not exhibit any pronounced flow. However, at some predetermined elevated temperatures of from about 80° C. or greater, as directed by the application for the sheet product, the ply formed from the first polymeric composition must be capable of having a sufficient change in viscosity (decrease) or related elasticity to exhibit flow and ability to collapse into its pores. This temperature is the transformation temperature of the first polymer composition. At this transformation temperature, the second polymer composition must maintain sufficient high viscosity and thus retain its elastic energy, i.e. show substantially no flow.

The polymeric compositions useful in forming each ply of the multi-ply sheet product of the present invention can be selected from known classes of polymers capable of forming a microporous sheet as, for examples, polyolefins, polysulfones such as polyarylether sulfones and the like, polyvinyl halides such as polyvinyl chloride, polyvinyl fluoride, polyvinylidene dichloride and the like, polytetrafluoroethylenepropylene copolymers, polyamides, polyphenyleneoxidepolystyrene copolymers, polycarbonates and the like. The polymers used to form the first and second sheets of the multi-ply sheet product are preferably selected from the same class of polymeric material to best provide the properties described above.

A preferred class of polymers are the polyolefins due to their inertness with respect to the other battery components with which they come in contact. The remainder of this description shall illustrate the present invention by combinations of the preferred embodiment wherein polyolefin compositions are used to form the present sheet materials and separators therefrom. It has been found that when forming a product having at least one first ply of an unfilled microporous polyolefin composition which normally exhibits the undesired properties of shrinkage in length and breadth in combination with at least one second polymer of a higher viscosity profile polyolefin composition one unexpectedly attains a product of low transformation temperature while exhibiting and maintaining high dimensional stability. For example, polymers can be selected from polyolefins, such as polyethylene, polypropylene, ethylene-butene copolymers, ethylene-hexene copolymers, ethylenemethacrylate copolymers and the like and mixtures thereof. The preferred polyolefin forming the first ply are polyolefin wax, low density polyethylene, low molecular weight, high density polyethylenes and copolymers of ethylene with other $\alpha$-olefins (especially $c_4$-$c_{10}$ alpha-olefins). The $\alpha$-olefin is present in from 5 to 20 weight percent of the copolymer. The polyolefins should have a weight average molecular weight of from 100,000 to about 5,000,000, preferably the first polymer will be a low weight average molecular weight polymer of from about 100,000 to about 1,000,000 and preferably the second polymer would have a higher weight average molecular weight including ultra-high (greater than about 2,000,000) molecular weight polyolefin (e.g. polyethylene).

The preferred polymers forming the first ply are polyolefins selected from polyethylene, polypropylene, ethylene-butene copolymers, ethylene-hexene copolymers, ethylene-methacrylate copolymers and the like. The first polymer will be chosen to have a low melting point to provide a nonporous first ply at a desired temperature within the range of from 80° C. to 150° C. and preferably from 80° C. to 120° C. The preferred first polymers have low weight average molecular weight of from 100,000 to 1,000,000.

The preferred polymers forming the second ply are polyolefins selected from polyethylene, polypropylene, ethylene-butene copolymers, ethylene-hexene copolymers, ethylene-methacrylate copolymers and the like. The second polymer will be chosen to have a melting point which is at least 10° C. higher, preferably at least 20° C. higher than the transformation of the first polymer. The second polymer preferably has a weight average molecular weight which is higher than that of the first polymer and is selected from greater than 100,000 to 2,000,000, most preferably 200,000 to 5,000,000.

The first polymer/second polymer combination should be chosen so there is a significant lower temperature-fluidity profile for the first ply with respect to the second ply. For example, suitable combinations are low density polyethylene/high density polyethylene; polyethylene/polypropylene/ narrow molecular weight polyethylene/broad molecular weight polyethylene; ethylene-butene copolymer (5:1 to 20:1)/polyethylene; ethylene-hexene copolymer (5:1 to 20:1)/polyethylene; ethylene-hexene copolymer (5:1 to 20:1)/polypropylene and the like.

Each ply is formed from a polymeric composition comprising a polymer, as described fully herein below and may, in addition, have uniformly distributed therein plasticizers, stabilizers, antioxidants, and the like for said polymer. The polymer composition should contain substantially no particulate filler although small amounts of up to about 15 weight percent, preferably less than 10 weight percent may be contained in the compositions. The first and second polymer compositions used to form the initial sheet product should contain extractable material, as fully described below.

The initial sheet product is formed by simultaneously extruding at least one sheet of first polymer composition and at least one sheet of second polymer composition together. This process step is preferably conducted by coextruding each of the first and second polymer compositions through a single die where they join together such that they form distinct, well-bonded plies to provide the single initial sheet product. The coextrusion can, for example, be performed using conventional feed block dies where each of the melted polymer compositions are combined in a relatively small cross-section before entering the die itself. The preferred manner of simultaneously forming the multi-ply initial sheet product is by coextrusion using a multimanifold internal combining die. In such a system, the first and second polymer compositions (as melt feed stock) enter the die separately and join just before the final die orifice. This system provides for the use of two or more polymer compositions of substantially different flow characteristics while enabling there to be a high degree of ply uniformity and thickness control to produce a thin initial sheet product.

The initial sheet can be formed by blown film technique. The film is initially formed by a coextrusion die having an annular exit port with air or other gas being injected into the center of the initial tube formation to cause expansion of the tube to a prescribed diameter. When the film is cooled it is slit to provide a multi-ply initial sheet product. This technique is used when it is desired to have an initial sheet of substantial width such as 30 to 40 inches wide. Alternatively, the initial sheet can be formed by sheet extrusion using a slit dye. In this instance, the width of the sheet will be substantially controlled by the slit dimension.

The multi-ply sheet product of the present invention must be composed of (a) at least one first ply of a predetermined length and breadth and of a thickness of less than about 10 mils (0.025 cm) preferably less than 5 mils (0.013 cm) and most preferably from 0.1 to 2 mils. The pores of the sheet must be of sufficient size and amount to permit the resultant sheet product of the present invention to exhibit low electrolytic resistivity i.e. 500 ohm-cm or less depending on the particular application. It is understood that the thinner the sheets dimensions are, the lower the overall volume percent of the sheet needs to be occupied by the pores to sustain the desired low electrolytic resistance. The pores of the first ply will normally have average pore size of from about 0.005 to about 50 microns in diameter and the pores normally occupy at least about 20 volume percent and preferably at least about 40 volume percent of the total volume of the sheet. The first ply is formed of a polymer composition having viscoelastic properties such that it is capable of transforming to a substantially non-porous sheet at a predetermined transformation temperature when a component of the multi-ply sheet product. The multi-ply sheet product must further be composed of (b) at least one second ply of a predetermined length and breath and a thickness of less than 10 mil (0.025 cm), preferably less than 5 mils (0.013 cm) and most preferably from 1 to 2 mils (0.010–0.005 cm) having average pore size of from about 0.005 to about 50 microns in diameter wherein the pores occupy at least about 20 volume percent and preferably at least about 40 volume percent of the sheet's volume. The ply (b) is substantially stable (minor shrinkage of less than 10 percent may occur over conventional battery life and can be accommodated for an initial design) in form and dimensions at temperatures ranging from ambient to at least about 10° C., preferably at least 20° C., greater than the transformation temperature of the polymer composition of ply (a). The present multi-ply sheet product is capable of maintaining its length and breath dimensions at the sheet product's transformation temperature and beyond.

The transformation temperature of a sheet product is the temperature at which the sheet, when in a battery cell, exhibits a large increase in electrolytic resistivity to provide resistivity sufficient to substantially shut down a battery system or a portion of such a system (for example one cell) or a localized portion to prevent undesired thermal runaway. Electrolytic resistivity of at least about 1500 ohm-cm is normally sufficient to shut down a battery system although greater or lesser resistance may be sufficient for a particular battery or for a particular application. The transformation temperature is normally from 80° C. to 150° C., preferably from 80° C. to 120° C. and substantially coincides with the temperature at which the composition of the first ply exhibits sufficient fluidity and ability to collapse into its pores to provide a substantially non-porous sheet while a component of the sheet product.

The first and second plies are each formed from polymeric compositions. The polymer matrix must be selected from polymers which are inert under the conditions encountered in a battery especially with respect to the electrolyte composition. In addition, each polymer composition must be capable of exhibiting microporosity and must also be capable of being formed into a thin sheet of less than 10 mils, preferably less than 5 mils and most preferably less than 2 mils. In addition, each polymer composition is a substantially unfilled composition to enhance its capability to form thin coextruded sheet product.

Each first and second polymeric composition should contain an extractable material which is miscible with the polymer utilized to form the particular composition and which is capable of extraction from the initial sheet product by a common extractant. The miscibility may be only at elevated temperatures used to process the composition and form it into a sheet or ply of the initial sheet product.

The polymeric component of each ply forming the sheet product of the present invention must be chosen in a judicious manner so that the polymeric component of the first ply has a significant lower temperature-fluidity profile than that chosen for the second ply. Secondly, the first and second polymers must be compatible to be capable of having the first and second plies formed therefrom adhere to each other. Thirdly, the first and second polymers must be inert with respect to the battery environment for which the resultant sheet product is intended for use. Fourthly, the second polymer composition must be capable of maintaining its high viscosity-fluidity profile up to at least 10° C., preferably at least 20° C., above the transformation temperature of the first polymer composition used to form a sheet. Thus, although the polymers may be chosen from a number of film-forming polymeric materials, they must meet the above criteria. For example, a high density, narrow molecular weight polyethylene (as first polymer)/high density, broad molecular weight distribution polyethylene (as second polymer) combination; a low density polyethylene/high density polyethylene combination; a polyethylene/polypropylene combination; and the like can be used in forming the initial sheet product. In addition, although the polymer may be a homopolymer, each may be chosen from copolymers as, for example ethylenebutene copolymer/polyethylene; ethylene-hexene copolymer/polyethylene, ethylene-butene copolymer/polypropylene; and the like. The preferred material being the use of copolymers of ethylene-butene or ethylene-hexene copolymers as the first polymer. The choice of first polymer will be dictated by the particular transition temperature of the sheet product. Where low transition temperature (80° C.–110° C.) sheet product is desired, the first polymer can be chosen from copolymers of ethylene-butene or ethylene-hexene having narrow molecular weight distribution. The preferred second polymer is selected from high density polyethylene or predominantly isotactic ($>80\%$) polypropylene.

Each first and second polymeric compositions used to form an initial sheet product must also contain an extractable material which is (1) a liquid at the temperature (usually an elevated temperature of from about 100° C. to about 250° C.) at which the initial sheet product is formed (e.g. the extrusion temperature when using coextrusion as the forming means); (2) substantially miscible at the forming temperature with the polymer used in forming the same ply; and (3) soluble in a solvent or solvent system which is also a solvent or solvent system for the extractable component of the other plies of the initial sheet product.

The extractable material should be at least 30 percent by weight (preferably at least 50 percent and most preferably at least about 60 percent) of each first polymeric composition and of each second polymeric composition forming an initial sheet product.

The extractable material can be soluble or insoluble in water. Representative of the water-insoluble extractable components are organic esters, such as the sebacates, phthalates, stearates, adipates, and citrates; epoxy compound such as epoxidized vegetable oil; phosphate esters such as tricresyl phosphate; hydrocarbon resin; low molecular weight polymers such as polybutadiene, polystyrene, coumarone-indene resins; and terpene resins; and linseed oil. Illustrative of the water-soluble extractable materials are ethylene glycol, polyethylene glycol, polypropylene glycol, glycerol, and ethers and esters thereof; alkyl phosphates such as triethyl phosphate; polyvinyl alcohol, polyacrylic acid and polyvinyl pyrrolidone. The preferred extractable material to be used when forming the preferred embodiment of this invention (i.e. polyolefin polymer) are aromatic dicarboxylic acid esters of $C_3$–$C_5$ alkyl alcohols such as dibutyl phthalate, diisopropyl phthalate, dibutyl isophthalate, and the like and $C_6$–$C_9$ alkanyl dicarboxylic acid esters of $C_3$–$C_5$ alkyl alcohols, such as dibutyl azelate, diisopropyl azelate, dibutyl sebacate, diisopropyl sebacate, dipentyl sebacate and the like and mixtures thereof.

When the first and second ply of an initial sheet product are formed from polymeric compositions based on olefinic polymers, such as ethylene-butene copolymer/high density polyethylene; ethylene-butene copolymer/ultra high molecular weight polyethylene; ethylene-butene copolymer/polypropylene and the like, the preferred extractable material component used in such first and second polymeric composition are dibutyl sebacate and dibutyl phthalate. Most preferably, the sebacate is used with polyethylene systems and phthalate with polypropylene systems.

As stated above, the first and second polymeric compositions may each contain stabilizers, antioxidants, nucleating agents, additives and processing aids as known to those skilled in the art. Representative of the stabilizers include 4,4-thiobis (6-tert-buty-m-cresol), 2,6-ditert-butyl-4-methylphenol and the like. Representatives of antioxidants include hydroquinone and and the like. Representatives of other additives including carbon black which may have high surface area (1000 $m^2$/gm) and the like. Representatives of processing aids include zinc stearate and the like. The processing aids, stabilizers, antioxidants and the like are used in conventional low amounts such as up to about 2 percent. The carbon black additive may be used in up to about 10 percent by weight.

Each first and second polymeric composition is processed separately by conventional methods such as mixing, grinding, milling and the like to provide substantially homogeneous compositions. The compositions are concurrently fed to the initial sheet forming means such as an extrusion apparatus fitted with a coextrusion head and related feed means. The initial sheet product is formed. This initial sheet product is normally a two-ply product having one first ply and one second ply or a three-ply product having one first ply contained between two second plies.

The initial sheet product is then subjected to an extraction process to remove the first and second extractable components from the initial sheet product. The extraction of both first and second extractable components are preferably done simultaneously by a single stage extraction. The solvent and extraction conditions should be chosen so that the first and second polymers are essentially insoluble. Numerous extracting solvents are suitable for forming the sheet products of this invention with the particular solvent depending upon the particular component to be extracted. For example, if dibutyl phthalate is used as the first and/or second extractable material solvents suitable to extract it from the multilayer sheet material are chlorinated hydrocarbons, such as trichloroethylene (preferred), tetrachloroethylene, carbon tetrachloride, methylene chloride, tetrachloroethane, and the like. Other suitable solvents include hydrocarbon solvents such as hexane, benzene, petroleum ether, toluene, cyclohexane, gasoline, and the like.

The time of the extraction will vary depending upon the temperature used and the nature of the system. For example, when higher temperatures are used, the extraction time for an oil of low viscosity can be less than a minute, whereas, if the extraction is performed at room temperature, the time requirement for extraction of a polymeric plasticizer may be in the order of a half hour or even longer.

In the above combinations where olefinic polymers are used as the first and second polymer, it has been found that a high degree of porosity can be achieved when one uses an extractable material selected from the aromatic and aliphatic esters described above, especially from the dibutyl esters of phthalic acid and sebacatic acid. The extractable components can be present in from 30 and preferably from about 50 to about 70 wt. percent of each first and second polymeric composition.

The product obtained from the extraction step is a microporous multi-ply polymer sheet product.

The exact final composition of each ply will depend on the original composition. Each ply exhibits microporosity. The size of the pores of the present sheet product have a substantial proportion which are less than of 0.5 micron diameter (Capillary Flow Porometry Method) and are generally tortuous in nature. It has been found that the microporosity can be set in the structure of the final sheet product by subjecting the formed sheet product to uniaxial stretching. The stretching can be accomplished by varying the speed of the take-up roll subsequent to extraction. The stretching should be done at temperatures of from about 25° C. to about 110° C. and preferably from about 40° C. to about 100° C. The stretching should be at a ratio of at least 1:1.05 and preferably from about 1:2 to about 1:4.

The resultant sheet products have been found to be capable of exhibiting inhibition to dendrite growth, high conductivity at ambient temperatures, capability to be formed into a very thin sheet products, and stability to the environment produced by and components of the battery. In addition, the present sheet products are dimensionally stable and do not exhibit unacceptable and detrimental shrinkage in its length and breath dimensions when subjected to elevated temperatures. The sheet product, therefore, when used as a separator does not permit contact of electrodes even at temperatures when conventional polyolefin separators would degrade and/or shrink.

The sheet products formed by the present process has the ability to drastically reduce its degree of porosity while maintaining its length and breath upon being subject to a predetermined elevated temperature. The reduced porosity caused a "shut-down" of the battery's electrical system by being a barrier to the passage of ions in the electrolyte between electrodes of opposite polarity. This "shut-down" ability can, in lithium batteries, act as a "safety switch" which in effect, turns off the circuit prior to harm being done through thermal runaway or explosion of the defective battery.

The following examples are given for illustrative purposes only and are not meant to be a limitation on the invention described herein and in the claims appended hereto. All parts and percentages given below are by weight unless otherwise stipulated.

EXAMPLE 1

A mixture of 60% dibutyl sebacate and 40% high density polyethylene having a wt. average molecular weight of 127,000 was prepared by blending the components in an extruder at 200° C. The blend was then ground up using a grinder. A mixture of 60% dibutyl sebacate and 40% ethylene-butene (ca. 10% butene) copolymer having a wt. average molecular weight of 143,000 was also prepared in the same manner. The two grinds were coextruded using a blown film die at a temperature of 165° C. to form a two layer film. The film was placed in 1,1,1-trichloroethane to extract the dibutyl sebacate. The extracted film was stretched (3:1) in the machine direction at a temperature of about 90° C.

The resultant microporous, two-ply film had a thickness of 1 mil and exhibited an electrical resistivity of 49 ohm-cm in 35 wt. % sulfuric acid and a machine direction tensile strength of 1855 psi. Subjecting this film to a temperature of 90° C. did not affect the electrical resistivity. Subjecting this film to a temperature of 100° C. caused the electrical resistance to rise above 1500 ohm-cm.

EXAMPLE 2

The method of Example 1 was followed except that a three-layer film was prepared, the center layer containing the ethylene-butene copolymer.

This film had an electrical resistivity of 8.4 ohm-cm in 35 wt. % sulfuric acid and a machine direction tensile strength of 1490 psi. Subjecting this film to a temperature of 90° C. did not affect the electrical resistivity. Subjecting this film to a temperature of 100° C. caused the electrical resistance to rise above 1500 ohm-cm.

EXAMPLE 3

The method of Example 2 was repeated except that the center layer was formed using ethylene-butene copolymer (ca. 13% butene) having a weight average molecular weight of 152,000. The film had an electrical resistivity of 12 ohm-cm in 35 wt. % sulfuric acid and an average pore size of 0.23 microns. The film showed a transition temperature at 110° C. with an increase in electrical resistivity to above 1500 ohm-cm.

EXAMPLE 4

The process of Example 1 is repeated except that a high molecular weight (about 500,000) predominantly isotactic polypropylene is used instead of the polyethylene and the dibutyl sebacate was replaced with dibutyl phthalate. A second sheet was made with a mixture of (52/8) dibutyl phthalate and hydrocarbon resin (Picotac of Hercules, M.P. of about 100° C.) in the polypropylene ply while the ethylene-butene ply contained only dibutyl phthalate.

The resultant sheet products exhibit low electrical resistivity of less than 50 ohm-cm at temperatures of up to about 95° C. After exposure to 100° C., the resistivity is greater than 1500 ohm-cm.

EXAMPLE 5

The process of Example 1 is repeated except that an ethylene-hexene (9:1) copolymer of 110,000 wt average molecular weight is used instead of the ethylene-butene copolymer.

The resultant sheet exhibits low electrical resistivity up to about 120° C. and then transforms to a high resistivity (>1500 ohm-cm) product when exposed to this higher temperature.

EXAMPLE 6

The process of Examples 1-3 are repeated except that diisopryl sebacate is used instead of the sabacate. The results are substantially the same as reported above.

What is claimed:

1. A battery separator having at least two plies comprising
   a) at least one first ply in the form of a microporous sheet of a predetermined length and breadth and of less than 10 mils thickness and having pores of an average pore size of from about 0.005 to 50 microns in diameter occupying at least about 20 volume percent of said sheet, said sheet composed of a substantially unfilled first polymer composition;
   b) at least one second ply in the form of a microporous sheet of a predetermined length and breadth and of less than 10 mils thickness and having pores of an average pore size of from about 0.005 to 50 microns in diameter occupying at least about 20 volume percent of said sheet, said sheet composed of a substantially unfilled second polymer composition; each of said first and second ply being bonded together to provide a unitary sheet product capable of maintaining its length and breadth dimension and the viscosity of the first polymer composition and the second polymer composition are ultra-high and substantially the same at temperature of from ambient to about 70° C. while, at a transformation temperature of from about 80° C. to 150° C., said first polymer composition has a sufficient decrease in viscosity to exhibit flow to cause sheet (a) to be substantially non-porous while said second polymer composition maintains its ultra-high viscosity for at least 10° C. above the transformation temperature.

2. The product of claim 1 wherein the first polymer composition is composed of a copolymer selected from ethylene-butene or ethylene-hexene.

3. The product of claim 1 wherein the second polymer composition is composed of a polymer selected from polyethylene or polypropylene.

4. The product of claim 2 wherein the second polymer composition is composed of a polymer selected from polyethylene or polypropylene.

5. The product of claim 4 wherein the pore volume of each first ply and of each second ply is at least about 50 percent.

6. A process of forming a microporous multi-ply sheet product comprising
   a) forming a first polymer composition composed of an inert first polymer and a first extractable material which is miscible with the first polymer at processing temperatures;
   b) forming a second polymer composition composed of an inert second polymer and a second extractable material which is miscible with the second polymer at processing temperatures; said first and second extractable materials each, respectively, being a first polymer and second polymer miscible liquid at the conditions of forming initial sheet product under step (c) and being miscible in a common solvent;
   c) forming an initial sheet product having at least one ply composed of the first polymer composition and at least one ply composed of the second polymer composition;
   d) contacting the initial sheet product with the common solvent to substantially remove the first and second extractable materials therefrom; and
   e) recovering a final sheet product having at least two plies comprising
      1) at least one first ply in the form of a microporous sheet of a predetermined length and breadth and of less than 10 mils thickness and having pores of an average pore size of from about 0.005 to 50 microns in diameter occupying at least about 20 volume percent of said sheet, said sheet composed of a substantially unfilled first polymer composition;

2) at least one second ply in the form of a microporous sheet of a predetermined length and breadth and of less than 10 mils thickness and having pores of an average pore size of from about 0.005 to 50 microns in diameter occupying at least about 20 volume percent of said sheet, said sheet composed of a substantially unfilled second polymer composition; each of said first and second ply being bonded together to provide a unitary sheet product capable of maintaining its length and breadth dimension and the viscosity of the first polymer composition and the second polymer composition are ultra-high and substantially the same at temperature of from ambient to about 70° C. while, at a transformation temperature of from about 80° C. to 150° C., said first polymer composition has a sufficient decrease in viscosity to exhibit flow to cause sheet (a) to be substantially non-porous while said second polymer composition maintains its ultra-high viscosity for at least 10° C. above the transformation temperature.

7. The process of claim 6 wherein the step c) is a coextrusion forming step.

8. The process of claim 7 wherein the extrusion forming step employs a multi-manifold internal combining die.

9. The process of claim 8 wherein the extrusion forming step is a blown film or cast film technique.

10. The process of claim 6 wherein the inert first polymer and inert second polymer are each selected from a polyolefin.

11. The process of claim 10 wherein the inert first polymer is selected from low density polyethylene, copolymers of ethylene/butene or copolymers of ethylene/hexene.

12. The process of claim 10 wherein the inert second polymer is selected from high density polyethylene, ultra-high molecular weight polyethylene or polypropylene.

13. The process of claim 11 wherein the inert second polymer is selected from high density polyethylene, ultra-high molecular weight polyethylene or polypropylene.

14. The process of claim 10 wherein the extractable material is selected from an aromatic dicarboxylic acid $C_3$-$C_5$ alkyl ester or $C_6$-$C_9$ alkanyl dicarboxylic acid $C_3$-$C_5$ alkyl ester.

15. The process of claim 14 wherein the extractable material is selected from a $C_3$-$C_5$ alkyl ester of sebacatic acid, a $C_3$-$C_5$ alkyl ester of phthalic acid or a $C_3$-$C_5$ alkyl ester of isophthalic acid.

16. The process of claim 6 wherein the initial sheet product is formed by a coextrusion process of blown film or cast film technique; the first inert polymer is selected from low density polyethylene, copolymers of ethylene/butene or copolymers of ethylene-hexene; the second inert polymer is selected from high density polyethylene, ultra-high molecular weight polyethylene, polypropylene; and the extractable material is selected from a $C_3$-$C_5$ alkyl ester of phthalic acid, a $C_3$-$C_5$ alkyl ester of isophthalic acid or a $C_3$-$C_5$ alkyl ester of sebacatic acid.

17. The process of claim 16 wherein the recovery step (e) further includes stretching the sheet product to affix microporosity therein.

18. A sheet product formed according to the process of claim 6.

19. A sheet product formed according to the process of claim 7.

20. A sheet product formed according to the process of claim 10.

21. A sheet product formed according to the process of claim 13.

22. A sheet product formed according to the process of claim 14.

23. A sheet product formed according to the process of claim 15.

24. A sheet product formed according to the process of claim 16.

25. A sheet product formed according to the process of claim 17.

* * * * *